United States Patent
Ahn et al.

(10) Patent No.: US 9,256,967 B2
(45) Date of Patent: Feb. 9, 2016

(54) SYSTEMS AND METHODS FOR PARTIAL VOLUME CORRECTION IN PET PENALIZED-LIKELIHOOD IMAGE RECONSTRUCTION

(71) Applicant: General Electric Company, Schenectady, NY (US)

(72) Inventors: Sangtae Ahn, Niskayuna, NY (US); Evren Asma, Niskayuna, NY (US); Ravindra Manjeshwar, Niskayuna, NY (US); Steven Ross, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 252 days.

(21) Appl. No.: 13/667,757

(22) Filed: Nov. 2, 2012

(65) Prior Publication Data

US 2014/0126794 A1    May 8, 2014

(51) Int. Cl.
*G06K 9/00*    (2006.01)
*G06T 11/00*    (2006.01)

(52) U.S. Cl.
CPC .................................. *G06T 11/008* (2013.01)

(58) Field of Classification Search
CPC .. A61B 6/5217; G06T 7/0012; G06T 7/0081; G06T 2207/10104; G06T 11/008; G06K 9/50
See application file for complete search history.

(56) References Cited

U.S. PATENT DOCUMENTS

| | | | |
|---|---|---|---|
| 7,186,984 B2 | 3/2007 | Bonnin et al. | |
| 7,312,455 B2 | 12/2007 | Manjeshwar et al. | |
| 2003/0048937 A1* | 3/2003 | Gullberg et al. | 382/131 |
| 2004/0225214 A1 | 11/2004 | Trotter et al. | |
| 2009/0018438 A1 | 1/2009 | Schroder et al. | |
| 2009/0212225 A1* | 8/2009 | Zheng et al. | 250/363.04 |
| 2009/0273610 A1* | 11/2009 | Busch et al. | 345/619 |
| 2010/0023345 A1* | 1/2010 | Schottlander | 705/2 |
| 2010/0290680 A1* | 11/2010 | Declerck et al. | 382/128 |
| 2010/0290684 A1* | 11/2010 | Bendriem et al. | 382/131 |
| 2012/0070052 A1* | 3/2012 | Maroy et al. | 382/131 |

OTHER PUBLICATIONS

Barbee et al., A method for partial volume correction of PET-imaged tumor heterogeneity using expectation maximization with a spatially varying point spread function, 2010, Phys. Med. Biol. 55, pp. 221-236.*

Srinivas et al., A recovery coefficient method for partial volume correction of PET images, 2009, Ann. Nucl. Med. 23, pp. 341-348.*

Soret et al., Partial-Volume Effect in PET Tumor Imaging, 2007, The Journal of Nuclear Medicine, vol. 48, No. 6, pp. 932-945.*

(Continued)

*Primary Examiner* — Vu Le
*Assistant Examiner* — Guillermo Rivera-Martinez
(74) *Attorney, Agent, or Firm* — Robert M. McCarthy

(57) ABSTRACT

A computer-implemented method for partial volume correction in Positron Emission Tomography (PET) image reconstruction includes receiving emission data related to an activity distribution, reconstructing the activity distribution from the emission data by maximizing a penalized-likelihood objective function to produce a reconstructed PET image, quantifying an activity concentration in a region of interest of the reconstructed PET image to produce an uncorrected quantitation, and correcting the uncorrected quantitation based on a pre-calculated contrast recovery coefficient value to account for a partial volume error in the uncorrected quantitation.

17 Claims, 7 Drawing Sheets

(56) References Cited

OTHER PUBLICATIONS

Ahn et al., Convergent Incremental Optimization Transfer Algorithms: Application to Tomography, Mar. 2006, IEEE Transactions on Medical Imaging, vol. 25, No. 3, pp. 283-296.*

AAPA—Qi et al., "Resolution and Noise Properties of MAP Reconstruction for Fully 3-D PET", May 2000, IEEE Transactions on Medical Imaging, vol. 19, No. 5, pp. 493-506.*

Avril et al., "Breast imaging with fluorine-18-FDG PET: quantitative image analysis", Journal of Nuclear Medicine, pp. 1186-1191, vol. 38, Issue 8, Aug. 1997.

Fessler et al., "Spatial Resolution Properties of Penalized-Likelihood Image Reconstruction: Space-Invariant Tomographs", IEEE Transactions on Image Processing, pp. 1346-1358, vol. 5, Issue 9, Sep. 1999.

Hoetjes et al., "Partial Volume Correction Strategies for Quantitative FDG PET in Oncology", European Journal of Nuclear Medicine and Molecular Imaging, pp. 1679-1687, vol. 37, Issue 9, Apr. 27, 2010.

Kirov et al., "Partial Volume Effect Correction in PET Using Regularized Iterative Deconvolution with Variance Control Based on Local Topology", Physics in Medicine and Biology, pp. 2577-2591, vol. 53, Issue 10, May 21, 2008.

Soret et al., "Partial-Volume Effect in PET Tumor Imaging", Journal of Nuclear Medicine, pp. 932-945, vol. 48, Issue 6, Jun. 2007.

Srinivas et al., "A Recovery Coefficient Method for Partial Volume Correction of PET Images", Annals of Nuclear Medicine, pp. 341-348, vol. 23, Issue 4, Apr. 15, 2009.

Teo et al., "Partial-Volume Correction in PET: Validation of an Iterative Postreconstruction Method with Phantom and Patient Data", Journal of Nuclear Medicine, pp. 802-810, vol. 48, Issue 5, May 2007.

Zheng et al., "An Automatic Method for PET Target Segmentation Using a Lookup Table Based on Volume", Technology in Cancer Research & Treatment, pp. 243-252, vol. 9, Issue 3, Jun. 2010.

* cited by examiner

302

| Tumor diameter | Tumor activity | Normalized smoothing parameter | Local perturbation response | CRC |
|---|---|---|---|---|
| | | | | |

304

| Tumor diameter | Tumor activity | Normalized smoothing parameter | FWHM of LPR | Uncorrected contrast quantitation | CRC |
|---|---|---|---|---|---|
| | | | | | |

306

| Tumor diameter | (Tumor activity)/(Background activity) | (Normalized smoothing parameter)/(Background activity) | (Local perturbation response)/(Background activity) | CRC |
|---|---|---|---|---|
| | | | | |

308

| Tumor diameter | (Tumor activity)/(Background activity) | (Normalized smoothing parameter)/(Background activity) | FWHM of LPR | (Uncorrected contrast quantitation)/(Background activity) | CRC |
|---|---|---|---|---|---|
| | | | | | |

FIG. 3

| 512 | Uncorrected SUV (RC) | Corrected SUV (RC) |
|---|---|---|
| Tumor 506 | 5.59 (84%) | 6.35 (96%) |
| Tumor 508 | 3.98 (67%) | 5.34 (90%) |
| Tumor 510 | 3.84 (69%) | 5.22 (93%) |

SYSTEMS AND METHODS FOR PARTIAL VOLUME CORRECTION IN PET PENALIZED-LIKELIHOOD IMAGE RECONSTRUCTION

FIELD

This disclosure relates generally to medical imaging, and more particularly, to systems and methods for partial volume correction in images reconstructed from positron emission tomography emission data.

BACKGROUND

Positron emission tomography (PET) is a medical imaging technique that provides in vivo functional information on physiological processes. In PET, positron-emitting radionuclides on biologically active molecules, such as fluorodeoxyglucose (FDG), are introduced into a patient. A radionuclide in the patient's body decays and emits a positron, which undergoes an annihilation with a nearby electron, subsequently generating a pair of 511 keV gamma ray photons that travel in nearly opposite directions. If a pair of gamma ray photons are detected within a coincidence timing window by two in an array of PET detectors, a coincidence event is recorded for the line of response (LOR), which is a line between the two detectors that have detected the photon pair. Each event is sorted in an array called a sinogram.

PET image reconstruction is used to reconstruct the three-dimensional distribution of the radiotracer in the patient's body from the measured sinogram data. The spatial distribution of the radiotracer is called an activity or emission image, or simply an image, and an estimate of the unknown true image provided by an image reconstruction process is called a reconstructed image.

Reconstructed PET images are used for quantitative analysis. Standardized uptake value (SUV), often used for a simple semi-quantitative analysis, provides clinically important information for diagnosis, staging and monitoring response to treatment of cancer. The SUV may be calculated as a maximum voxel value (SUVmax) or a mean over a region of interest (SUVmean or SUVpeak). However, PET imaging systems have finite spatial image resolution limited by the detector design and also by the image reconstruction process. The finite image resolution of a PET imaging system causes bias errors in region of interest (ROI) quantitation, which are called partial volume errors (PVEs). For accurate and consistent quantitation, PVE may be appropriately corrected. However, partial volume correction (PVC) for penalized-likelihood image reconstruction is difficult because PVE is affected by a number of factors including patient size, photon count, ROI location, background activity and reconstruction parameters in complex ways.

SUMMARY

In one embodiment, a computer-implemented method for partial volume correction in Positron Emission Tomography (PET) image reconstruction includes receiving emission data related to an activity distribution, reconstructing the activity distribution from the emission data by maximizing a penalized-likelihood objective function to produce a reconstructed PET image, quantifying an activity concentration in a region of interest of the reconstructed PET image to produce an uncorrected quantitation, and correcting the uncorrected quantitation based on a pre-calculated contrast recovery coefficient value to account for a partial volume error in the uncorrected quantitation.

In some embodiments, the method may further include accessing the pre-calculated contrast recovery coefficient from a lookup table (LUT) residing in a memory operatively coupled to the processor. In some embodiments, the LUT may include a plurality of contrast recovery coefficient values each indexed according to a reference size of the lesion, a reference uncorrected contrast quantitation, a reference size of the reconstructed lesion, a reference local perturbation response and/or a reference smoothing parameter.

In some embodiments, the step of correcting the uncorrected quantitation may include receiving an estimated size of a lesion in the region of interest or calculating a size of the reconstructed lesion or a local perturbation response in the region of interest of the reconstructed PET image. This step may further include receiving an estimated background activity concentration in the region of interest, calculating an aggregate certainty value associated with the region of interest based on the emission data, calculating a smoothing parameter normalized by the aggregate certainty value, selecting the pre-calculated contrast recovery coefficient value from the LUT based on the estimated size of the lesion, the uncorrected quantitation, the size of the reconstructed lesion, the local perturbation response, the normalized smoothing parameter and/or the estimated background activity concentration, and calculating a corrected quantitation as a function of: ((the uncorrected quantitation−the estimated background activity concentration)/the pre-calculated contrast recovery coefficient value)+the estimated background activity concentration. In some embodiments, the method may include storing, in a database, the aggregate certainty map, which consists of the aggregate certainty values for the voxel set, and the reconstructed PET image, where the aggregate certainty map is associated with the reconstructed PET image stored in the database.

In some embodiments, calculating the local perturbation response may include subtracting the estimated background activity concentration from the reconstructed image in the region of interest.

In some embodiments, the method may further include calculating the pre-calculated contrast recovery coefficient value by simulating a lesion of a particular size and activity concentration in an object background with a unit background activity concentration to produce a simulated object. The method may further include generating simulated PET emission data based on the simulated object, reconstructing the simulated object from the simulated PET emission data maximizing a penalized-likelihood objective function with a variable smoothing parameter to produce a reconstructed PET image, quantifying a simulated activity concentration in a region of interest of the reconstructed PET image to produce a simulated uncorrected quantitation of the reconstructed PET image, calculating the simulated uncorrected contrast quantitation by subtracting the background activity concentration from the simulated uncorrected quantitation, calculating the pre-calculated contrast recovery coefficient value as a ratio of the simulated uncorrected contrast quantitation to the difference of an actual quantitation of the simulated object and the background activity concentration, calculating one of a simulated local perturbation response in the region of interest of the reconstructed PET image and a size of the reconstructed lesion in the reconstructed PET image, and calculating an aggregate certainty value associated with the region of interest based on the simulated PET emission data, calculating the variable smoothing parameter normalized by the aggregate certainty value. The method may further include storing the pre-calculated contrast recovery coefficient value in the LUT indexed according to the particular size of the lesion, the size of the reconstructed lesion in the reconstructed PET image, the uncorrected contrast quantitation, the local perturbation response of the reconstructed PET image and/or the variable smoothing parameter.

In some embodiments, the method may further include repeating the step of calculating the pre-calculated contrast recovery coefficient value for a plurality of simulated lesions having different sizes and/or activity concentrations. In some embodiments, the uncorrected quantitation may include a standardized uptake value.

In one embodiment, a computer-implemented method of determining a pre-calculated contrast recovery coefficient value for use in partial volume correction in Positron Emission Tomography (PET) image reconstruction includes simulating a lesion of a particular size and activity concentration in an object background with a unit background activity concentration to produce a simulated object, generating simulated PET emission data based on the simulated object, and reconstructing the simulated object from the simulated PET emission data by maximizing a penalized-likelihood objective function with a variable smoothing parameter to produce a reconstructed PET image. The method further includes quantifying a simulated activity concentration in a region of interest of the reconstructed PET image to produce a simulated uncorrected quantitation of the reconstructed PET image, calculating the simulated uncorrected contrast quantitation by subtracting the background activity concentration from the simulated uncorrected quantitation, calculating the pre-calculated contrast recovery coefficient value as a ratio of the simulated uncorrected contrast quantitation to the difference of an actual quantitation of the simulated object and the background activity concentration, calculating a simulated local perturbation response in the region of interest of the reconstructed PET images or a size of the reconstructed lesion in the reconstructed PET image, calculating an aggregate certainty value associated with the region of interest based on the simulated PET emission data, and calculating the variable smoothing parameter normalized by the aggregate certainty value. The method further includes storing the pre-calculated contrast recovery coefficient value in a lookup table (LUT) indexed according to the particular size of the reconstructed lesion, the size of the lesion in the reconstructed PET image, the uncorrected contrast quantitation, the local perturbation response of the reconstructed PET image and/or the variable smoothing parameter, the LUT residing in a memory operatively coupled to the processor.

In one embodiment, a non-transitory computer-readable medium has stored thereon computer-executable instructions that when executed by a computer cause the computer to receive emission data related to an activity distribution, reconstruct the activity distribution from the emission data by maximizing a penalized-likelihood objective function to produce a reconstructed PET image, quantify an activity concentration in a region of interest of the reconstructed PET image to produce an uncorrected quantitation, and correct the uncorrected quantitation based on a pre-calculated contrast recovery coefficient value to account for a partial volume error in the uncorrected quantitation.

In some embodiments, the step of correcting the uncorrected quantitation may include computer-executable instructions that when executed by the computer cause the computer to receive an estimated size of a lesion in the region of interest or calculate a size of the reconstructed lesion or a local perturbation response in the region of interest of the reconstructed image, receive an estimated background activity concentration in the region of interest, calculate an aggregate certainty value associated with the region of interest based on the emission data, calculate a smoothing parameter normalized by the aggregate certainty value, select the pre-calculated contrast recovery coefficient value from a lookup table (LUT) based on at least one of the estimated size of the lesion, the uncorrected quantitation, the size of the reconstructed lesion, the local perturbation response, the normalized smoothing parameter and the estimated background activity concentration, and calculate a corrected quantitation as a function of: ((the uncorrected quantitation−the estimated background activity concentration)/the pre-calculated contrast recovery coefficient value)+the estimated background activity concentration.

In some embodiments, the computer readable medium may further include computer-executable instructions that when executed by the computer cause the computer to calculate the pre-calculated contrast recovery coefficient value by simulating a lesion of a particular size and activity concentration in an object background with a unit background activity concentration to produce a simulated object, generating simulated PET emission data based on the simulated object, reconstructing the simulated object from the simulated PET emission data maximizing a penalized-likelihood objective function with a variable smoothing parameter to produce a reconstructed PET image, quantifying a simulated activity concentration in a region of interest of the reconstructed PET image to produce a simulated uncorrected quantitation of the reconstructed PET image, calculating the simulated uncorrected contrast quantitation by subtracting the background activity concentration from the simulated uncorrected quantitation, calculating the pre-calculated contrast recovery coefficient value as a ratio of the simulated uncorrected contrast quantitation to the difference of an actual quantitation of the simulated object and the background activity concentration, calculating one of a simulated local perturbation response in the region of interest of the reconstructed PET image and a size of the reconstructed lesion in the reconstructed PET image, calculating an aggregate certainty value associated with the region of interest based on the simulated PET emission data, and calculating the variable smoothing parameter normalized by the aggregate certainty value. The computer readable medium may further include computer-executable instructions that when executed by the computer cause the computer to store the pre-calculated contrast recovery coefficient value in the LUT indexed according to at least one of the particular size of the lesion, the size of the reconstructed lesion in the reconstructed PET image, the uncorrected contrast quantitation, the local perturbation response of the reconstructed PET image and the variable smoothing parameter.

In one embodiment, a system for partial volume correction in Positron Emission Tomography (PET) image reconstruction includes a processor, an input coupled to the processor and configured to receive a PET emission dataset, and a memory coupled to the processor. The memory includes computer-executable instructions that when executed by the processor cause the processor to receive emission data related to an activity distribution, reconstruct the activity distribution from the emission data maximizing a penalized-likelihood objective function to produce a reconstructed PET image, quantify an activity concentration in a region of interest of the reconstructed PET image to produce an uncorrected quantitation, and correct the uncorrected quantitation based on a pre-calculated contrast recovery coefficient value to account for a partial volume error in the uncorrected quantitation.

In some embodiments, the memory may further include computer-executable instructions that when executed by the processor cause the processor to receive an estimated size of a lesion in the region of interest or calculate a size of the reconstructed lesion or a local perturbation response in the region of interest of the reconstructed image, receive an estimated background activity concentration in the region of interest, calculate an aggregate certainty value associated with the region of interest based on the emission data, calculate a smoothing parameter normalized by the aggregate certainty value, select the pre-calculated contrast recovery coefficient value from a lookup table (LUT) based on the estimated size of the lesion, the uncorrected quantitation, the size of the reconstructed lesion, the local perturbation response, the normalized smoothing parameter and/or the estimated background activity concentration, and calculate a corrected quantitation as a function of ((the uncorrected quantitation–the estimated background activity concentration)/the pre-calculated contrast recovery coefficient value)+ the estimated background activity concentration. In some embodiments, the memory may further include computer-executable-instructions that when executed by the processor cause the processor to store, in a database, the aggregate certainty map, which consists of the aggregate certainty values for the voxel set, and the reconstructed PET image, where the aggregate certainty map is associated with the reconstructed PET image stored in the database.

In some embodiments, the LUT may include a plurality of contrast recovery coefficient values each indexed according to the size of the lesion, the size of the reconstructed lesion, the uncorrected contrast quantitation, the local perturbation response and/or the smoothing parameter. The memory may further include computer-executable instructions that when executed by the processor cause the processor to calculate the local perturbation response by subtracting the estimated background activity concentration from the reconstructed image in the region of interest. In some embodiments, the memory may further include computer-executable instructions that when executed by the processor cause the processor to calculate the pre-calculated contrast recovery coefficient value by simulating a lesion of a particular size and activity concentration in an object background with a unit background activity concentration to produce a simulated object, generating simulated PET emission data based on the simulated object, reconstructing the simulated object from the simulated PET emission data by maximizing a penalized-likelihood objective function with a variable smoothing parameter to produce a reconstructed PET image, quantifying a simulated activity concentration in a region of interest of the reconstructed PET image to produce a simulated uncorrected quantitation of the reconstructed PET image, calculating the simulated uncorrected contrast quantitation by subtracting the background activity concentration from the simulated uncorrected quantitation, calculating the pre-calculated contrast recovery coefficient value as a ratio of the simulated uncorrected contrast quantitation to the difference of an actual quantitation of the simulated object and the background activity concentration, calculating one of a simulated local perturbation response in the region of interest of the reconstructed PET images and a size of the reconstructed lesion in the reconstructed PET image, calculating an aggregate certainty value associated with the region of interest based on the simulated PET emission data, calculating the variable smoothing parameter normalized by the aggregate certainty value, and store the pre-calculated contrast recovery coefficient value in the LUT indexed according to at least one of the particular size of the lesion, the size of the reconstructed lesion in the reconstructed PET image, the uncorrected contrast quantitation, the local perturbation response of the reconstructed PET image and the variable smoothing parameter.

In some embodiments, the memory may further include computer-executable instructions that when executed by the processor cause the processor to repeat the step of calculating the pre-calculated contrast recovery coefficient value for a plurality of simulated lesions having different sizes and/or activity concentrations. In some embodiments, the uncorrected quantitation may include a standardized uptake value.

BRIEF DESCRIPTION OF THE DRAWINGS

Features and aspects of embodiments are described below with reference to the accompanying drawings, in which elements are not necessarily depicted to scale.

FIG. 3 depicts several examples of lookup tables for partial volume correction, in accordance with various embodiments.

DETAILED DESCRIPTION

Figure 1:
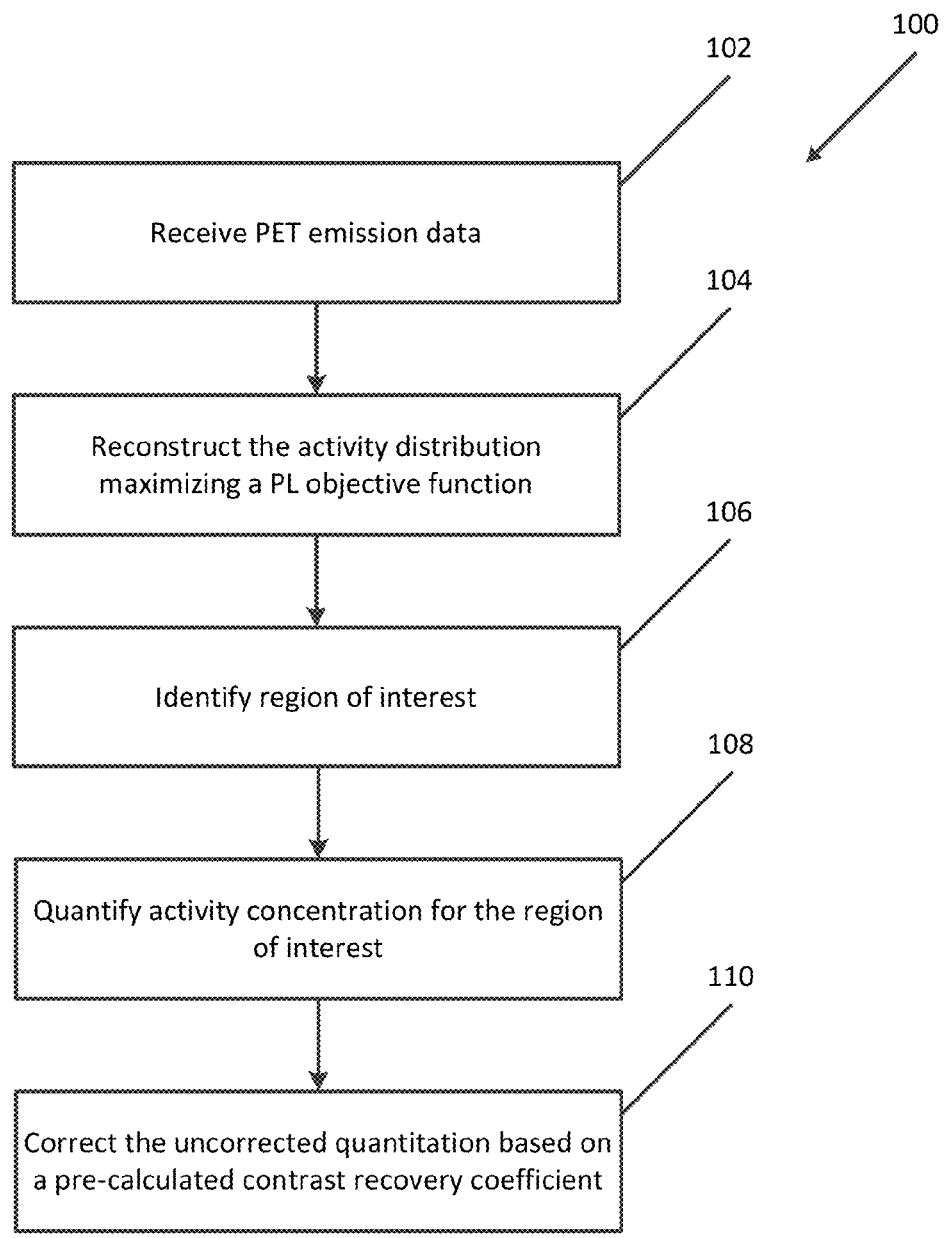
FIG. 1 is a flow diagram of one example of a partial volume correction process, in accordance with one embodiment.

Exemplary embodiments are directed to systems and methods for partial volume correction in PET penalized-likelihood image reconstruction. In one embodiment, one or more contrast recovery coefficients (CRC), which are defined as a ratio of a reconstructed contrast to a true contrast, are calculated and stored in a multidimensional lookup table (LUT) with indexing variables, including a normalized smoothing parameter. In another embodiment, a method of partial volume correction includes selecting a pre-calculated CRC from a LUT for use in correcting quantitation of reconstructed PET images, which achieves accurate and consistent quantitation for penalized-likelihood image reconstruction, regardless of patient size, photon count, ROI location, background activity and reconstruction parameters.

In analytical image reconstruction methods, such as filtered backprojection (FBP), which are based on ideal line integral models in continuous space, it is relatively straightforward to analyze the finite resolution effects and correct for the PVEs since the methods are linear and space-invariant. Using these analytical methods, a reconstructed image can be modeled as a convolution of the true object and a point spread function. Therefore, one conventional PVC method involves deconvolution.

Iterative image reconstruction methods, also known as model-based or statistical image reconstruction, provide better image quality than the analytical reconstruction methods by using accurate physics and noise models. However, these iterative methods are typically nonlinear, space-variant and object-dependent. In other words, PVEs in iterative image reconstruction are affected in a nonlinear way by a number of factors including patient size, background activity, photon count, ROI location and reconstruction parameters. Therefore, it may be difficult to correct systematically for PVEs in iterative image reconstruction.

Recovery coefficients (RCs), which are defined as the ratio of the reconstructed activity concentration to the true activity concentration, have been used for partial volume correction. RCs are pre-calculated from phantom experiments with varying factors such as tumor size and shape, image resolution and reconstruction parameter, and then the pre-calculated RCs are used for partial volume correction. (Here the terms, tumor and lesion, are interchangeably used.) The RC methods work well for the analytical image reconstruction methods, which are linear and shift-invariant. However, they do not accurately and consistently correct for PVEs in iterative image reconstruction methods, which depend typically on patient size, photon count, ROI location and reconstruction parameter in a nonlinear way.

Penalized-Likelihood Image Reconstruction

As discussed above, in PET, an image reconstruction process estimates the three-dimensional spatial distribution of a radiotracer in the patient body from measured sinogram data. The radiotracer distribution is called an object or an (activity or emission) image. According to one embodiment, in penalized-likelihood (PL) image reconstruction, also known as maximum a posteriori (MAP), a reconstructed image, $x^{recon}$, can be calculated by maximizing a PL objective function, which consists of the log-likelihood function L and the regularization function R:

$$x^{recon} = \arg\max_{x \geq 0} L(x) - \beta R(x)$$

where $\beta$ is a smoothing parameter, also known as a regularization parameter and a hyper-parameter, which controls the strength of regularization. The reconstructed image can be calculated using an iterative numerical optimization algorithm such as preconditioned conjugate gradient (PCG), block sequential regularized expectation maximization (BSREM), separable paraboloidal surrogates (SPS) and De Pierro's modified expectation maximization (EM).

In one embodiment, the PET data can be modeled as independent Poisson random variables. The Poisson log-likelihood L can be defined as:

$$L(x) = \Sigma_i y_i \log([Px]_i + r_i) - ([Px]_i + r_i)$$

where $y_i$ denotes the data for sinogram bin i, P is the system model including geometric forward projection, attenuation, normalization and detector blurring point spread functions, and $r_i$ are background contributions, such as scatters and random events.

In one embodiment, a regularization function R, also known as a penalty function and a prior distribution, can be defined as:

$$R(x) = (\tfrac{1}{2}) \Sigma_j \Sigma_{k \in N(j)} w_{jk} \alpha_{jk} \phi(x_j, x_k) \quad (1)$$

where $x_j$ denotes the image value in voxel j, N(j) denotes a set of neighbors of voxel j, $w_{jk}$ are data-independent weights, $\alpha_{jk}$ are data-dependent factors for spatially modulating smoothing parameters, and $\phi$ is a penalty function that penalizes image roughness. The weights $w_{jk}$ may be chosen to be inversely proportional to the distance between voxels j and k. The factors $\alpha_{jk}$ modulate spatially the smoothing parameter to achieve certain properties, such as uniform spatial resolution, uniform contrast recovery for impulses by using quadratic penalties, and spatially uniform perturbation responses for non-quadratic penalties. Otherwise, $\alpha_{jk}$ can be set to be 1.

There can be least two types of penalty functions, $\phi$. One class of penalty functions, $\phi^{diff}$, called roughness penalties independent of uniform background, depend only on the differences of neighboring voxel values. In other words, $\phi^{diff}(\eta, \xi) = \phi^{diff}(|\eta - \xi|)$. These penalties are independent of uniform background in the sense that:

$$\phi^{diff}(\eta + \zeta, \xi + \zeta) = \phi^{diff}(\eta, \xi) \quad (2)$$

for a given background value $\zeta$. One type of such penalties is the quadratic or Gaussian penalty, $\phi^{quad}(\eta, \xi) = (\tfrac{1}{2})(\eta - \xi)^2$. The quadratic penalty tends to oversmooth the edges in reconstructed images; however, some edge-preserving non-quadratic penalties exist, including generalized Gaussian, Huber and log cos h.

Another type of penalty is the relative difference penalty (RDP). The RDP can be defined as:

$$\phi^{RDP}(\eta, \xi) = (\eta - \xi)^2 / (\eta + \xi + \gamma |\eta - \xi|)$$

where $\gamma \geq 0$ is a parameter, which controls the degree of edge-preservation. It can be seen from:

$$\phi^{RDP}(\eta + \zeta, \xi + \zeta) = \zeta \phi^{RDP}(1 + (\eta/\zeta), 1 + (\xi/\zeta)) \quad (3)$$

that RDP is dependent on the background activity level $\zeta$.

Mathematical Analysis of Contrast Recovery Coefficient (CRC)

According to one embodiment, an object, x, can be defined to include a background object, b, and a tumor signal, s, on top of the background: x = b + s. The spatial support of the tumor signal, s, may be assumed to be local around voxel $j_0$. The background, b, may be assumed to be locally uniform around voxel $j_0$ with a background activity level $b_0$. The local perturbation response, $s^{recon}$, may be defined as the difference of the reconstructed image, $x^{recon}$, when the tumor is present and the reconstructed image, $b^{recon}$, when the tumor is absent. Therefore, the local perturbation response, $s^{recon}$, may represent how the tumor signal, s, becomes blurred by the finite image resolution of a PET imaging system including an image reconstruction process. In other words, s may represent a true contrast, and $s^{recon}$ may represent a reconstructed contrast.

Mathematical analysis using the Taylor expansion with the remainder term can yield the following approximation, which becomes accurate as the signal-to-noise ratio (SNR) increases:

$$[F + \beta \Omega(s^{recon}, b^{recon})] s^{recon} \approx Fs \quad (4)$$

where F is the Fisher information matrix given by $F = P^T \text{diag}\{1/y_i\} P$ with $\text{diag}\{\bullet\}$ denoting a diagonal matrix, and $\Omega(s,b) = \int_{[0,1]} \Box^2 R(b + \tau s) d\tau$. Equation (4) shows an implicit functional relationship between s and $s^{recon}$.

The Fisher information matrix, F, can be further approximated as:

$$F \approx \text{diag}\{\kappa_j\} F_0 \text{diag}\{\kappa_j\} \quad (5)$$

where $F_0 = P^T P$ and $\kappa_j$ is an aggregate certainty given by $\kappa_j^2 = \{\Sigma_i (P_{ij}^2 / y_i)\} / (\Sigma_i P_{ij}^2)$. When the forward model, P, is implemented in a factored form including detector blurring point spread functions, an approximate form of the aggregate certainty can be used. See, for example, J. Qi and R. M. Leahy, "Resolution and noise properties of MAP reconstructions in fully 3D PET," IEEE Transactions on Medical Imaging, 19(5), pp. 493-506, 2000. Other approximate forms can be used for the aggregate certainty for computational efficiency.

If the data-dependent factors, $\alpha_{jk}$, in equation (1) vary slowly with j and k, the regularization function can be approximated locally around voxel $j_0$:

$$R(x) \approx \beta_{j0} R_0(x) \quad (6)$$

where $\beta_{j0} = \alpha_{j_0 k_0} \beta$ with voxel $k_0$ being a neighbor of voxel $j_0$ and $R_0(x) = (\tfrac{1}{2}) \Sigma_j \Sigma_{k \in N(j)} w_{jk} \phi(x_j, x_k)$ is independent of the data.

Combining equations (4)-(6) with the assumption that $b^{recon}$ is locally uniform around voxel $j_0$ with a value of $b_0$ yields the following approximation:

$$[F_0 + (\beta_{j0}/\kappa_{j0}^2)\Omega_0(s^{recon}, b_0)]s^{recon} \approx F_0 s \quad (7)$$

where $\Omega_0(s,b) = \int_{[0,1]} \Box^2 R_0(b+\tau s)d\tau$.

In one embodiment, for PL image reconstruction using roughness penalty functions independent of uniform background, equations (2) and (7) yield the following equation:

$$s^{recon} = h^{diff}(s, (\beta_{j0}/\kappa_{j0}^2)) \quad (8)$$

for some function $h^{diff}$. Even if the function $h^{diff}$ is unknown, this expression defines the local perturbation response, $s^{recon}$, as a function of the true tumor signal, $s$, and the normalized smoothing parameter, $\beta_{j0}/\kappa_{j0}^2$. In other words, for the roughness penalties independent of uniform background, the contrast recovery is dependent only on the tumor, which can be characterized by shape, size and activity, and the normalized smoothing parameter, which captures all the factors such as patient size, photon count, tumor location and reconstruction parameters except the intrinsic tumor characteristics.

In another embodiment, for PL image reconstruction using RDP, equations (3) and (7) yield the following equation:

$$s^{recon}/b_0 = h^{RDP}(s/b_0, (\beta_{j0}/\kappa_{j0}^2)/b_0) \quad (9)$$

for some function $h^{RDP}$. Therefore, this expression implies that the reconstructed contrast $s^{recon}/b_0$ (i.e., the local perturbation response, $s^{recon}$, divided by the background activity, $b_0$) is a function of the true contrast, $s/b_0$, and the normalized smoothing parameter, $\beta_{j0}/\kappa_{j0}^2$, divided by the background activity, $b_0$. For RDP, the normalized smoothing parameter captures all the factors, which affect the contrast recovery, except the intrinsic tumor characteristics.

DESCRIPTION OF EXEMPLARY EMBODIMENTS

FIG. 1 is a flow diagram of one example of a partial volume correction process 100, according to one embodiment.

In process 100, PET emission data for a patient is acquired (step 102). The PET data may be, for example, time-of-flight (TOF) PET data or non-TOF PET data, list-mode PET data or sinogram PET data, and/or gated PET data. An activity distribution can be reconstructed from the emission data by maximizing a penalized-likelihood (PL) objective function to produce a reconstructed PET image (step 104). A numerical optimization algorithm, such as preconditioned conjugate gradient (PCG), block sequential regularized expectation maximization (BSREM), separable paraboloidal surrogates (SPS) and De Pierro's modified expectation maximization (EM), or a penalized weighted least squares (PWLS) algorithm may be used to produce the reconstructed PET image.

From the reconstructed image, a region of interest (e.g., a tumor) for quantitative analysis can be identified manually or semi-manually with the aid of a computer (step 106). Then, an activity concentration can be quantified for the region of interest to produce an uncorrected quantitation (e.g., a standardized uptake value (SUV)) (step 108). The uncorrected quantitation can be corrected based on a pre-calculated contract recovery coefficient (CRC), which is the ratio of the uncorrected contrast quantitation to the true contrast quantitation, to account for a partial volume error in the uncorrected quantitation (step 110), which produces a corrected quantitation (e.g., a PVE-corrected SUV). A contrast quantitation may be calculated by subtracting the background activity concentration from a quantitation. For example, the uncorrected contrast quantitation may be calculated by subtracting the background activity concentration from the uncorrected quantitation, and the true contrast quantitation may be calculated by subtracting the background activity concentration from the true quantitation. In some embodiments, the pre-calculated CRC can be obtained, or accessed, from a LUT stored in a computer memory. The LUT may be indexed by, for example, a reference tumor size, a reference activity concentration, a normalized smoothing parameter value, a background activity, a local perturbation response, the size of a reconstructed tumor and/or a measured SUV (i.e., uncorrected quantitation).

Figure 2:
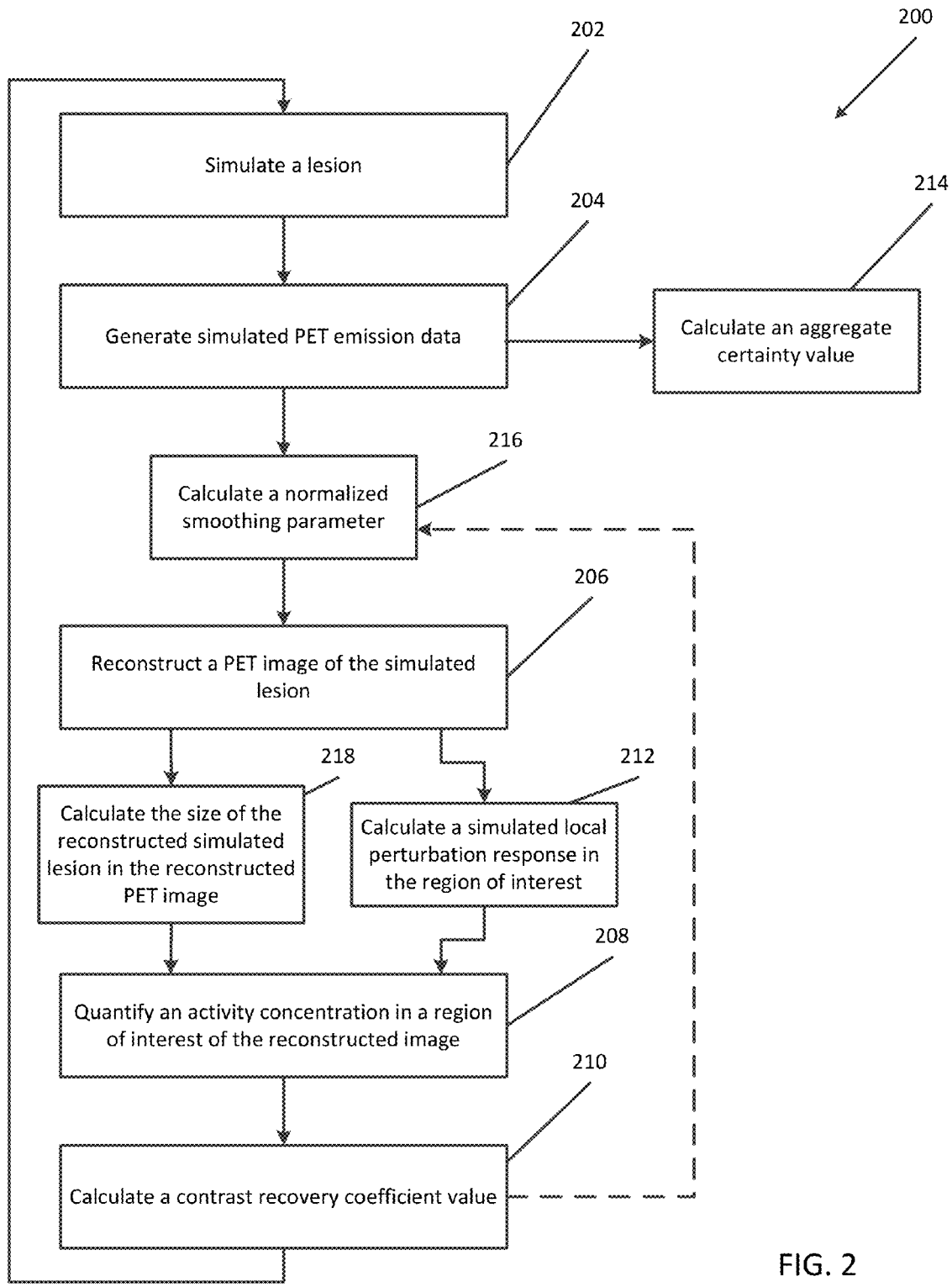
FIG. 2 is a flow diagram of one example of a process for pre-calculating a multidimensional look up table, in accordance with one embodiment.

FIG. 2 is a flow diagram of one example of a process 200 for calculating one or more CRC values using simulated lesions of varying sizes and/or activity concentrations. The pre-calculated CRC values may be stored in a LUT for use by, for example, the process 100 described above with respect to FIG. 1. Although process 200 is described with respect to pre-calculating CRC values for reconstructing PET images of homogeneous spherical tumors (or circular tumors in 2D), other LUTs can be generated for different tumor shapes in a similar manner. The CRC values may be calculated in the context of a penalty function for PL image reconstruction, for instance an RDP or a roughness penalty such as Huber, generalized Gaussian, quadratic and log cos h. Penalty parameters for the penalty function may include, for example, the exponent of the generalized Gaussian, the transition point of the Huber penalty and the y parameter in the RDP. For different penalty parameters, separate LUTs may be generated in a similar manner. Furthermore, the CRC values may be calculated for a particular SUV definition, such as SUVmax, SUVmean and SUVpeak. For different SUV definitions, separate LUTs may be generated in a similar manner. The normalization by the injected activity and the body weight in SUV may be ignored without loss of generality for PVC of the absolute uptake quantitation.

Process 200 can begin by simulating a lesion of a particular size (e.g., diameter) and activity concentration in an object background with a unit background activity concentration to produce a simulated object (step 202). For example, the simulated tumor may be added to the center of a background object to construct the simulated object. The background object may, for example, be a human-sized homogeneous cylinder or elliptic cylinder with a fixed background activity. In some embodiments, a background object with an arbitrary background activity may be used for a simulated object and then used for normalizing the smoothing parameter, the LPR, the uncorrected contrast quantitation and the true contrast quantitation as in equation (9) and LUTs 306 and 308 of FIG. 3, described below.

Simulated PET emission data can be generated based on the simulated object (step 204). The data may, for example, be obtained by forward projecting the object or by Monte Carlo simulation. Further, simulated scatters and random coincidences may be added to the data. The simulated object can be reconstructed from the simulated PET emission data maximizing a penalized-likelihood objective function with a variable smoothing parameter to produce a reconstructed PET image (step 206). It will be understood that different reconstructed images may be generated from the simulated PET emission data by using different smoothing parameters for calculating different CRC values for a given lesion size and activity concentration level (e.g., by repeating steps 206, 208 and 210 for each of a plurality of different smoothing parameters).

A simulated activity concentration in a region of interest of the reconstructed PET image can be quantified to produce a simulated uncorrected quantitation of the reconstructed PET image (step 208). The simulated quantitation can include PVEs.

A pre-calculated contrast recovery coefficient value can be calculated as a ratio of the simulated uncorrected contrast quantitation to an actual contrast quantitation of the simulated object (step 210). The pre-calculated CRC may, for example, be stored in a LUT in a computer memory. The LUT may be indexed according to, for example, the particular size of the simulated lesion, the particular activity concentration of the simulated lesion, the size of the reconstructed lesion in the reconstructed PET image, the uncorrected contrast quantitation, the local perturbation response in the reconstructed PET image and/or the variable smoothing parameter.

In some embodiments, the process 200 may further include one or more of the following steps:
calculating a simulated local perturbation response in the region of interest of the reconstructed PET image (step 212);
calculating an aggregate certainty value associated with the region of interest (e.g., of the center voxel) based on the simulated PET emission data (step 214);
calculating the variable smoothing parameter normalized by the aggregate certainty value (step 216); and/or
calculating the size of the reconstructed lesion in the reconstructed PET image (step 218).

In one embodiment, the local perturbation response (LPR) calculated in step 212 can be calculated by subtracting the background object from the reconstructed image produced by step 206. In another embodiment, the LPR can be calculated as a difference of the reconstructed image and a reconstructed image from another data set generated using a tumor-absent background object. The width of the LPR may be calculated, for example, as the full width at half maximum (FWHM).

The process 200 can, in one embodiment, include repeating at least steps 202, 204, 206, 208 and 210 for calculating pre-calculated contrast recovery coefficient values for a plurality of simulated lesions having different sizes and/or activity concentrations.

As described above, for each patient dataset, an aggregate certainty map (set of values), which is of the same size as the reconstructed PET image, can be calculated and an activity distribution can be reconstructed from the emission data to produce a reconstructed PET image. In one embodiment, the aggregate certainty map and the reconstructed PET image can be stored in a database such that each aggregate certainty map is associated with the corresponding reconstructed PET image. In this manner, at a later time, the quantitation correction through PVC can be done retrospectively from the aggregate certainty map and the reconstructed PET image stored in the database without re-reconstructing the activity distribution and re-calculating the aggregate certainty map.

FIG. 3 shows the elements of several exemplary LUTs 302, 304, 306 and 308, any of which may be produced, for example, by process 200. For roughness penalties independent of uniform background, LUT 302 includes the following variables: the tumor diameter and activity, the normalized smoothing parameter, LPR and/or CRC. LUT 304 includes the FWHM of LPR and the uncorrected contrast quantitation, e.g., the measured SUV minus the background activity concentration, in place of LPR. In LUTs 306 and 308, for RDP, the tumor activity, the normalized smoothing parameter, LPR and the uncorrected contrast quantitation, that is, the measured SUV can be divided by the background activity (see, e.g., equation (9)). In another embodiment, the size of the reconstructed tumor, that is, the size of the LPR, which is differently calculated, for example, by thresholding or segmentation, may be used in place of the FWHM of the LPR.

Figure 4:
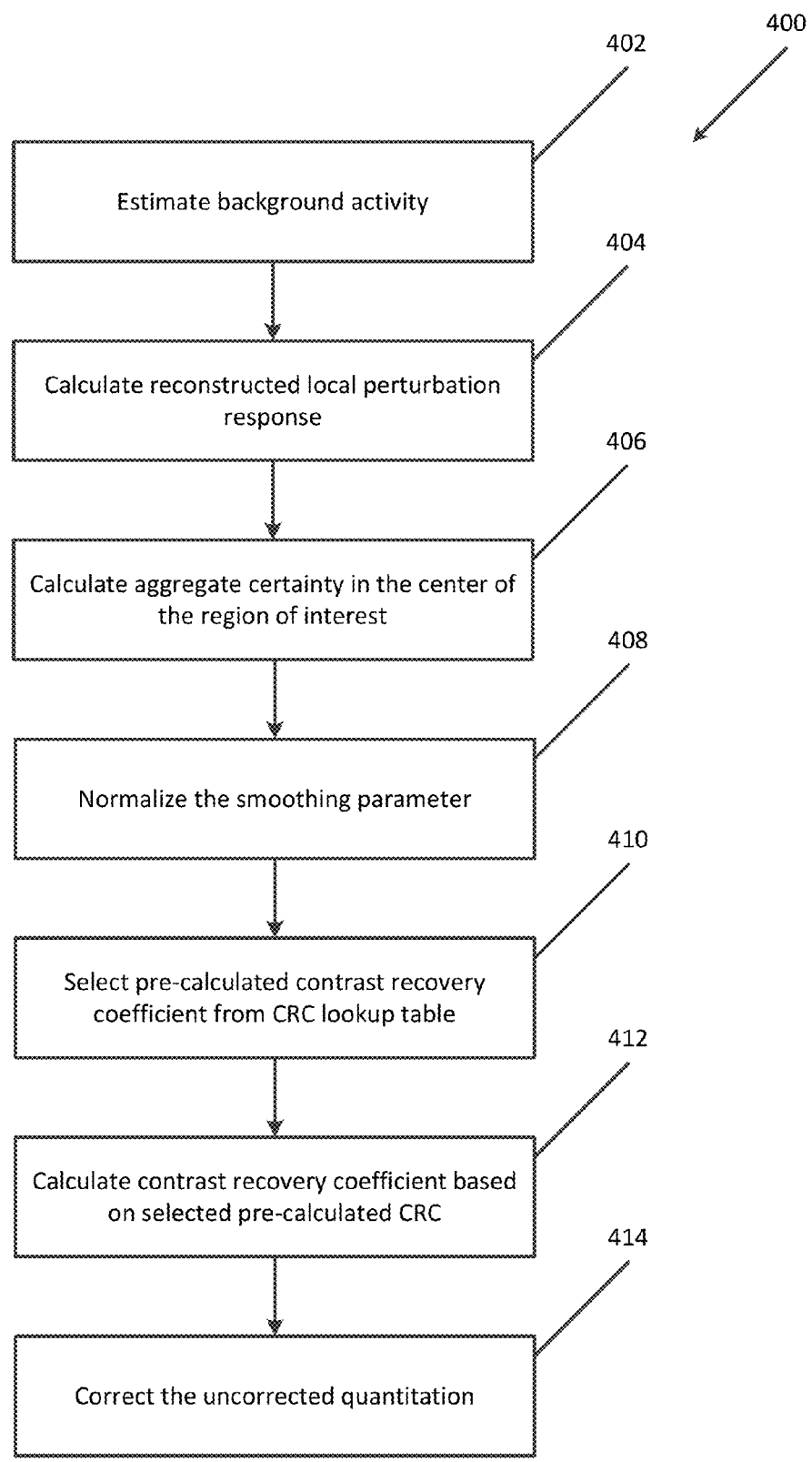
FIG. 4 is a flow diagram of one example of a partial volume correction process, in accordance with one embodiment.

FIG. 4 is a flow diagram showing one example of a process for partial volume correction 400 by using a LUT for CRC, such as described above with respect to FIG. 3, according to one embodiment. Process 400 may, in some embodiments, be included in step 110 of FIG. 1. Using the reconstructed PET image produced from clinical data, the background activity near the tumor can be estimated by taking background ROIs manually or semi-manually with the aid of a computer (step 402). A reconstructed LPR can be calculated by segmenting the tumor in the region of interest and then subtracting the estimated background activity from the segmented tumor (step 404). The region used for calculating LPR may be large enough to include the reconstructed tumor. The aggregate certainty in the center of the region of interest can be calculated from the PET data (step 406). For an exemplary method of calculating the aggregate certainty, see J. Qi and R. M. Leahy, "Resolution and noise properties of MAP reconstructions in fully 3D PET," IEEE Transactions on Medical Imaging, 19(5), pp. 493-506, 2000. In some embodiments, the voxel for calculating the aggregate certainty may be chosen from the region of interest other than the center, or the aggregate certainty values over some voxels in the region of interest may be averaged. The smoothing parameter can be normalized by the aggregated certainty value (Step 408).

In one embodiment, a CRC can be calculated (step 412) by interpolation using the normalized smoothing parameter (step 408) and the reconstructed LPR (step 404) as index values for selecting the pre-calculated CRC from the LUT (step 410) (e.g., as in LUT 302), using the normalized smoothing parameter, the FWHM of the reconstructed LPR and the measured SUV (e.g., as in LUT 304), or from other LUTs (e.g., LUTs 306 and 308). As described above, the size of the reconstructed tumor may be used as one of the index values instead of the FWHM of the reconstructed LPR. In some embodiments, the size of the tumor, which is estimated from other imaging modalities such as CT and MRI, may be used as one of the index values. The calculated CRC can be used to correct the uncorrected quantitation, for example, uncorrected SUV (step 414). The final corrected quantitation, e.g., the final corrected SUV, can be calculated (e.g., in step 110 of FIG. 1) by the following equation: ((uncorrected quantitation–the estimated background activity)/the calculated CRC)+the estimated background activity.

Figure 5:
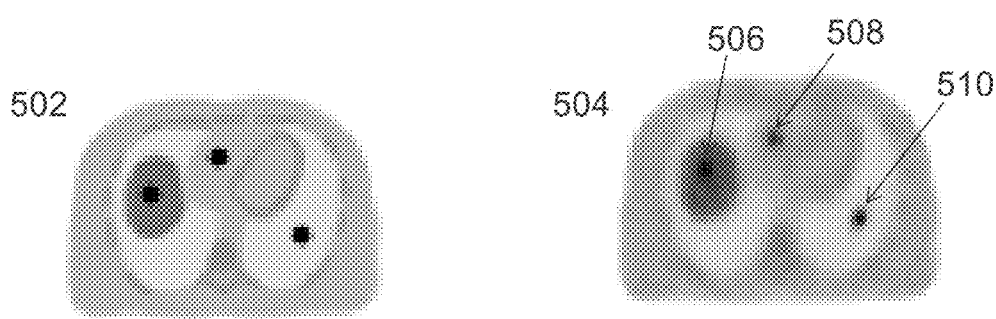
FIG. 5 depicts exemplary images reconstructed from PET data using a partial volume correction process, in accordance with one embodiment.

FIG. 5 shows example results obtained from applying process 100 to two-dimensional simulation data. The RDP was used for PL image reconstruction and the mean SUV was calculated in a 3 by 3 pixel ROI. The simulation data can be generated from an exemplary digital phantom 502, and the PL reconstructed image 504 depicts three tumors 506, 508 and 510. In this example, the LUT was generated using a uniform circular lesion in a uniform elliptic background object, independent of the digital phantom 502. Table 512 shows the mean SUV, before and after correction, with recovery coefficients (RCs). Table 512 shows that PVE can, using one or more embodiments, be corrected to achieve more accurate and consistent quantitation for penalized-likelihood image reconstruction as compared to uncorrected quantitations.

Figure 6:
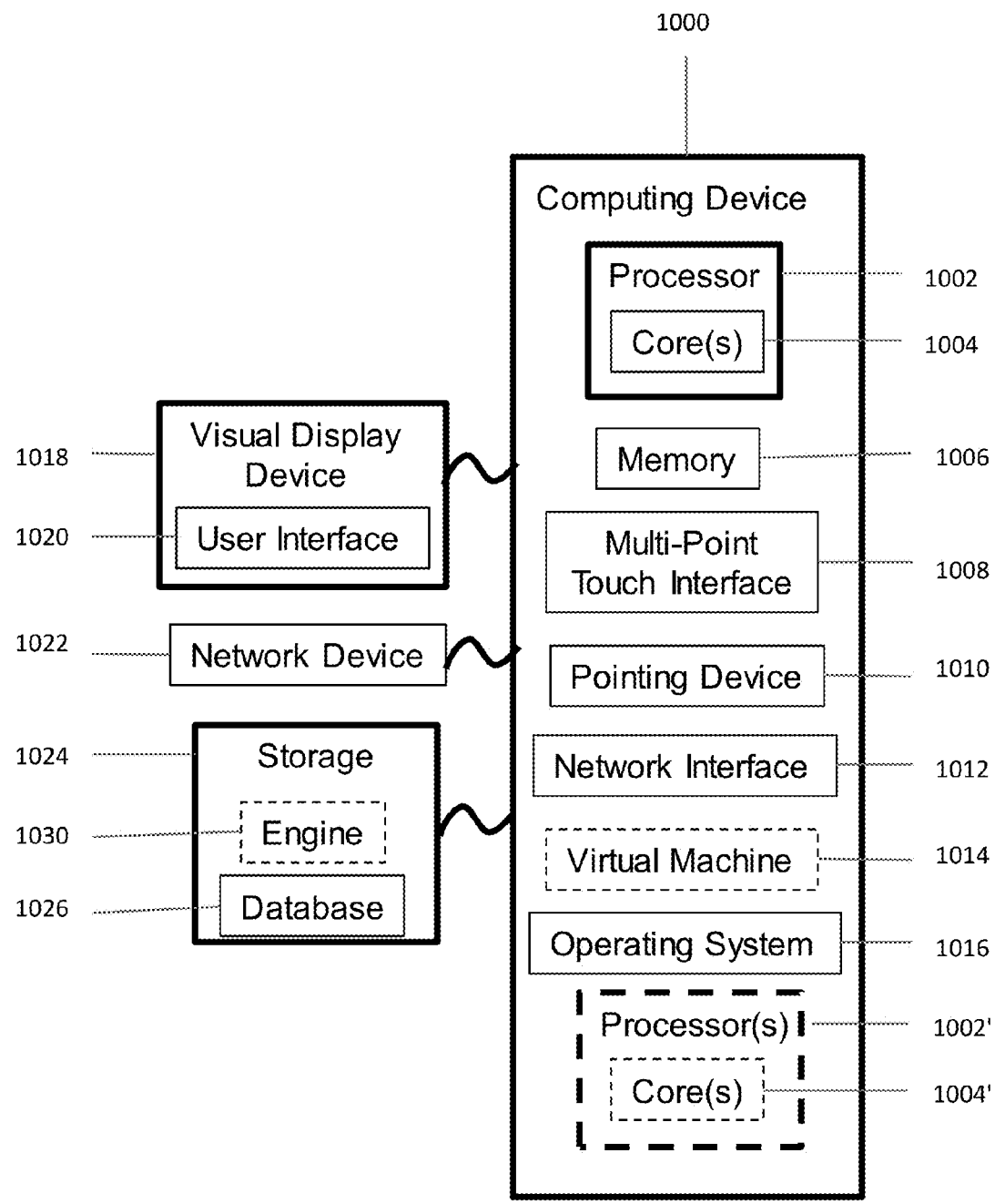
FIG. 6 is a block diagram of one example of a system for carrying out one or more embodiments.

FIG. 6 is a block diagram of an exemplary computing device 1000 that may be used to implement exemplary embodiments described herein. The computing device 1000 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 1006 included in the computing device 1000 may store computer-readable and computer-executable instructions or software for implementing exemplary embodiments, such as process 100 or 400 for partial volume correction and/or process 200 for calculating CRC values. The computing device 1000 also includes configurable and/or programmable processor 1002 and associated core 1004, and optionally, one or more additional configurable and/or programmable processor(s) 1002' and associated core(s) 1004' (for example, in the case of computer systems having multiple processors/cores), for executing computer-readable and computer-executable instructions or software stored in the memory 1006 and other programs for controlling system hardware. Processor 1002 and processor(s) 1002' may each be a single core processor or multiple core (1004 and 1004') processor.

Virtualization may be employed in the computing device 1000 so that infrastructure and resources in the computing device may be shared dynamically. A virtual machine 1014 may be provided to handle a process running on multiple processors so that the process appears to be using only one computing resource rather than multiple computing resources. Multiple virtual machines may also be used with one processor.

Memory 1006 may include a computer system memory or random access memory, such as DRAM, SRAM, EDO RAM, and the like. Memory 1006 may include other types of memory as well, or combinations thereof.

A user may interact with the computing device 1000 through a visual display device 1018, such as a computer monitor, which may display one or more user interfaces 1020 that may be provided in accordance with exemplary embodiments. The computing device 1000 may include other I/O devices for receiving input from a user, for example, a keyboard or any suitable multi-point touch interface 1008, a pointing device 1010 (e.g., a mouse). The interface 1008 and the pointing device 1010 may be coupled to the visual display device 1018. The computing device 1000 may include other suitable conventional I/O peripherals.

The computing device 1000 may also include one or more storage devices 1024, such as a hard-drive, CD-ROM, or other computer readable media, for storing data and computer-readable instructions and/or software that implement exemplary embodiments described herein. Exemplary storage device 1024 may also store one or more databases for storing any suitable information required to implement exemplary embodiments. For example, exemplary storage device 1024 can store one or more databases 1026 for storing information, such as emission data, PET images, image reconstruction algorithms, smoothing parameters, spatially variable modulation factors, LUTs for CRC and/or any other information. In one embodiment, one or more LUTs (e.g., such as shown in and described with respect to FIG. 3) may be pre-calculated and stored in the storage device 1024 for future use. The databases may be updated by manually or automatically at any suitable time to add, delete, and/or update one or more items in the databases. The storage device 1024 can also store an engine 1030 including logic and algorithms for performing one or more of the exemplary methods disclosed herein.

The computing device 1000 can include a network interface 1012 configured to interface via one or more network devices 1022 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1012 may include a built-in network adapter, network interface card, PCMCIA network card, card bus network adapter, wireless network adapter, USB network adapter, modem or any other device suitable for interfacing the computing device 1000 to any type of network capable of communication and performing the operations described herein. Moreover, the computing device 1000 may be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 1000 may run any operating system 1016, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 1016 may be run in native mode or emulated mode. In an exemplary embodiment, the operating system 1016 may be run on one or more cloud machine instances.

Figure 7:
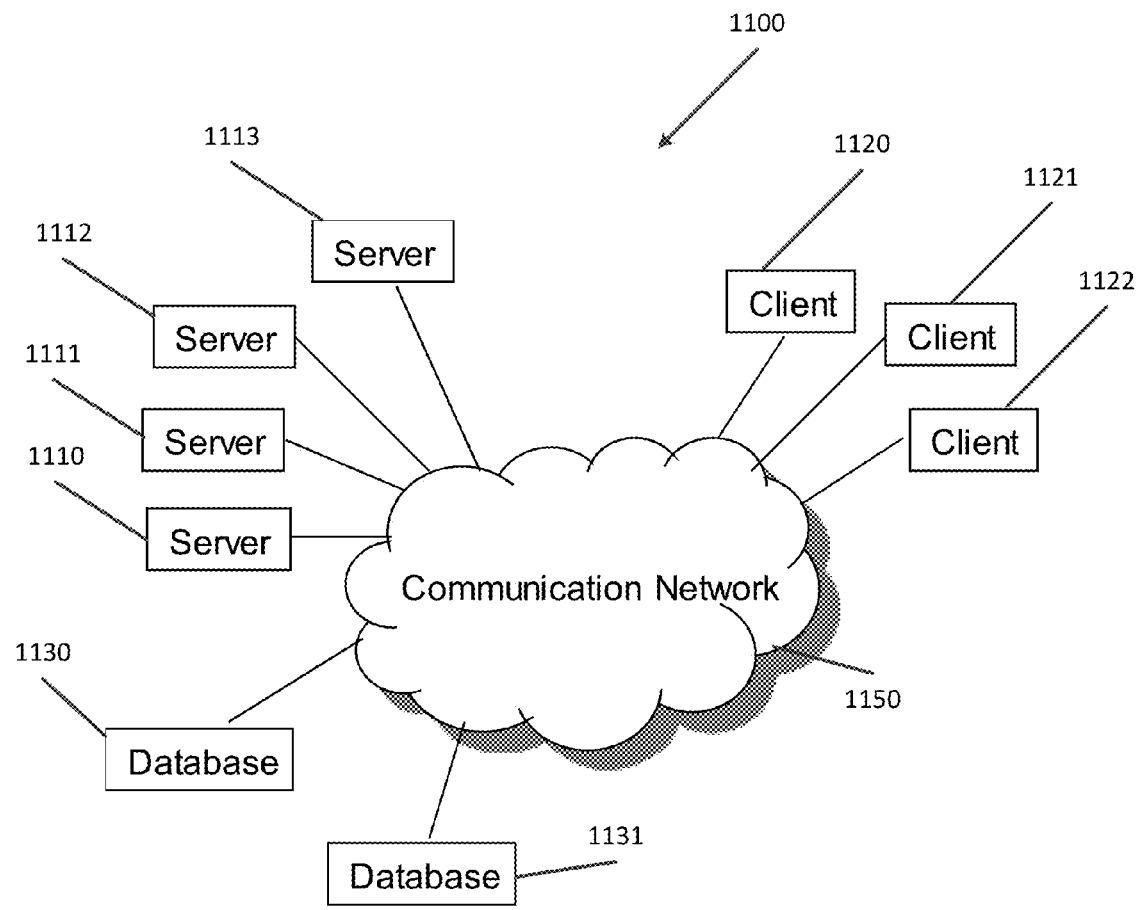
FIG. 7 is a block diagram of an exemplary client-server environment for implementing one or more embodiments.

FIG. 7 is a block diagram of an exemplary client-server environment 1100 configured to implement one or more embodiments disclosed herein. The computing system 1100 includes servers 1110-1113 operatively coupled to clients 1120-1122, via a communication network 1150, which can be any network over which information can be transmitted between devices communicatively coupled to the network. For example, the communication network 1150 can be the Internet, Intranet, virtual private network (VPN), wide area network (WAN), local area network (LAN), and the like. The computing system 1100 can include repositories or database devices 1130, 1131, which can be operatively coupled to the servers 1110-1113, as well as to clients 1120-1122, via the communications network 1150. The servers 1110-1113, clients 1120-1122, and database devices 1130, 1131 can be implemented as computing devices. Those skilled in the art will recognize that the database devices 1130, 1131 can be incorporated into one or more of the servers 1110-1113 such that one or more of the servers can include databases.

In some embodiments, the engine 1030 of FIG. 6 can be implemented by a single device, such as the server 1110. In some embodiments, the engine 1030 can be distributed among different devices (e.g., servers, clients, databases) in the communication network 1150 such that one or more components of the engine 1030, or portions thereof, can be implemented by different devices in the communication network 1150. In exemplary embodiments, the databases 1130, 1131 can store emission data, PET images, image reconstruction algorithms, smoothing parameters, spatially variable modulation factors, LUTs for CRC and/or any other information.

Having thus described several exemplary embodiments of the invention, it is to be appreciated various alterations, modifications, and improvements will readily occur to those skilled in the art. For example, some embodiments can be applied to partial volume correction for cold spots similar to hot spot PVC. In another example, some embodiments can be applied to a case where the PET system is highly space-variant. In this case, multiple LUTs can be generated for sampled points in the field of view (FOV). In some embodiments, the PVE-free contrast quantitation may be directly calculated from the LUT instead of PVC using CRC, e.g., see the tumor activity in LUTs 302-308. Accordingly, the foregoing description and drawings are by way of example only.

What is claimed is:

1. A computer-implemented method for partial volume correction in Positron Emission Tomography (PET) image reconstruction, the computer including a processor, the method comprising:

receiving, by the processor, emission data related to an activity distribution;

reconstructing, by the processor, the activity distribution from the emission data by maximizing a penalized-likelihood objective function based on a smoothing parameter to produce a reconstructed PET image;

quantifying, by the processor, an activity concentration in a region of interest of the reconstructed PET image to produce an uncorrected quantitation;

calculating, by the processor, an aggregate certainty value associated with the region of interest based on the emission data;

calculating or receiving, by the processor, an estimated background activity concentration in the region of interest;

calculating, by the processor, a normalized smoothing parameter by dividing the smoothing parameter associated with the region of interest by the calculated aggregate certainty value or dividing the smoothing parameter associated with the region of interest by the calculated aggregate certainty value and the estimated background activity concentration;

calculating, by the processor, a size of a reconstructed lesion associated with the region of interest based on the reconstructed PET image;

receiving or calculating, by the processor, at least one of an estimated size of a lesion associated with the region of interest and a local perturbation response in the region of interest of the reconstructed PET image; and correcting, by the processor, the uncorrected quantitation based on a pre-calculated contrast recovery coefficient value to account for a partial volume error in the uncorrected quantitation, wherein correcting the uncorrected quantitation comprises:

selecting, by the processor, the pre-calculated contrast recovery coefficient based on at least one of the estimated size of the lesion, the uncorrected quantitation, the size of the reconstructed lesion, the local perturbation response, the normalized smoothing parameter and the estimated background activity concentration; and calculating, by the processor, a corrected quantitation as a function of:

((the uncorrected quantitation−the estimated background activity concentration)/the pre-calculated contrast recovery coefficient value)+the estimated background activity concentration.

2. The computer-implemented method of claim 1, wherein selecting, by the processor, the pre-calculated contrast recovery coefficient comprises accessing the pre-calculated contrast recovery coefficient from a lookup table (LUT) residing in a memory operatively coupled to the processor.

3. The computer-implemented method of claim 2, wherein the LUT comprises a plurality of contrast recovery coefficient values each indexed according to a reference size of the reconstructed lesion and at least one of a reference size of the lesion, a reference uncorrected contrast quantitation, a reference local perturbation response and a reference smoothing parameter.

4. The computer-implemented method of claim 1, wherein calculating the local perturbation response comprises subtracting the estimated background activity concentration from the reconstructed image in the region of interest.

5. The computer-implemented method of claim 1, further comprising storing, in a database, an aggregate certainty map comprising aggregate certainty values for a voxel set, and the reconstructed PET image, wherein the aggregate certainty map is associated with the reconstructed PET image stored in the database.

6. The computer-implemented method of claim 2, further comprising calculating, by the processor, the pre-calculated contrast recovery coefficient value by:

simulating a lesion of a particular size and activity concentration in an object background with a unit background activity concentration to produce a simulated object;

generating simulated PET emission data based on the simulated object;

reconstructing the simulated object from the simulated PET emission data maximizing a penalized-likelihood objective function with a variable smoothing parameter to produce a reconstructed PET image;

quantifying a simulated activity concentration in a region of interest of the reconstructed PET image to produce a simulated uncorrected quantitation of the reconstructed PET image;

calculating the simulated uncorrected contrast quantitation by subtracting the background activity concentration from the simulated uncorrected quantitation;

calculating the pre-calculated contrast recovery coefficient value as a ratio of the simulated uncorrected contrast quantitation to the difference of an actual quantitation of the simulated object and the background activity concentration;

calculating one of a simulated local perturbation response in the region of interest of the reconstructed PET image and a size of the reconstructed lesion in the reconstructed PET image;

calculating an aggregate certainty value associated with the region of interest based on the simulated PET emission data;

calculating the variable smoothing parameter normalized by the aggregate certainty value; and storing the pre-calculated contrast recovery coefficient value in the LUT indexed according to at least one of the particular size of the lesion, the size of the reconstructed lesion in the reconstructed PET image, the uncorrected contrast quantitation, the local perturbation response of the reconstructed PET image and the variable smoothing parameter.

7. The computer-implemented method of claim 6, further comprising repeating the step of calculating the pre-calculated contrast recovery coefficient value for a plurality of simulated lesions having different sizes and/or activity concentrations.

8. A non-transitory computer-readable medium having stored thereon computer-executable instructions that when executed by a computer cause the computer to:

receive emission data related to an activity distribution;

reconstruct the activity distribution from the emission data by maximizing a penalized-likelihood objective function based on a smoothing parameter to produce a reconstructed PET image;

quantify an activity concentration in a region of interest of the reconstructed PET image to produce an uncorrected quantitation;

calculate an aggregate certainty value associated with the region of interest based on the emission data;

calculate or receive an estimated background activity concentration in the region of interest;

calculate a normalized smoothing parameter by dividing the smoothing parameter associated with the region of interest by the calculated aggregate certainty value or dividing the smoothing parameter associated with the region of interest by the calculated aggregate certainty value and the estimated background activity concentration;

calculate a size of a reconstructed lesion associated with the region of interest based on the reconstructed PET image;

receive or calculate at least one of an estimated size of a lesion associated with the region of interest and a local perturbation response in the region of interest of the reconstructed PET image; and correct the uncorrected quantitation based on a pre-calculated contrast recovery coefficient value to account for a partial volume error in the uncorrected quantitation, wherein correcting the uncorrected quantitation comprises:

selecting, by the processor, the pre-calculated contrast recovery coefficient based on at least one of the estimated size of the lesion, the uncorrected quantitation, the size of the reconstructed lesion, the local perturbation response, the normalized smoothing parameter and the estimated background activity concentration; and calculating, by the processor, a corrected quantitation as a function of:

((the uncorrected quantitation−the estimated background activity concentration)/the pre-calculated contrast recovery coefficient value)+the estimated background activity concentration.

9. The computer readable medium of claim 8, further comprising computer-executable instructions that when executed by the computer cause the computer to:

calculate the pre-calculated contrast recovery coefficient value by:

simulating a lesion of a particular size and activity concentration in an object background with a unit background activity concentration to produce a simulated object;

generating simulated PET emission data based on the simulated object;

reconstructing the simulated object from the simulated PET emission data maximizing a penalized-likelihood objective function with a variable smoothing parameter to produce a reconstructed PET image;

quantifying a simulated activity concentration in a region of interest of the reconstructed PET image to produce a simulated uncorrected quantitation of the reconstructed PET image;

calculating the simulated uncorrected contrast quantitation by subtracting the background activity concentration from the simulated uncorrected quantitation;

calculating the pre-calculated contrast recovery coefficient value as a ratio of the simulated uncorrected contrast quantitation to the difference of an actual quantitation of the simulated object and the background activity concentration;

calculating one of a simulated local perturbation response in the region of interest of the reconstructed PET image and a size of the reconstructed lesion in the reconstructed PET image;

calculating an aggregate certainty value associated with the region of interest based on the simulated PET emission data; and calculating the variable smoothing parameter normalized by the aggregate certainty value; and store the pre-calculated contrast recovery coefficient value in the LUT indexed according to at least one of the particular size of the lesion, the size of the reconstructed lesion in the reconstructed PET image, the uncorrected contrast quantitation, the local perturbation response of the reconstructed PET image and the variable smoothing parameter.

10. A system for partial volume correction in Positron Emission Tomography (PET) image reconstruction, the system comprising:

a processor;

an input coupled to the processor and configured to receive a PET emission dataset; and a memory coupled to the processor, the memory including computer-executable instructions that when executed by the processor cause the processor to:

receive emission data related to an activity distribution;

reconstruct the activity distribution from the emission data maximizing a penalized-likelihood objective function based on a smoothing parameter to produce a reconstructed PET image;

quantify an activity concentration in a region of interest of the reconstructed PET image to produce an uncorrected quantitation;

calculate an aggregate certainty value associated with the region of interest based on the emission data;

calculate or receive an estimated background activity concentration in the region of interest;

calculate a normalized smoothing parameter by dividing the smoothing parameter associated with the region of interest by the calculated aggregate certainty value or dividing the smoothing parameter associated with the region of interest by the calculated aggregate certainty value and the estimated background activity concentration;

calculate a size of a reconstructed lesion associated with the region of interest based on the reconstructed PET image;

receive or calculate at least one of an estimated size of a lesion associated with the region of interest and a local perturbation response in the region of interest of the reconstructed PET image; and correct the uncorrected quantitation based on a pre-calculated contrast recovery coefficient value to account for a partial volume error in the uncorrected quantitation wherein correcting the uncorrected quantitation comprises:

selecting, by the processor, the pre-calculated contrast recovery coefficient based on at least one of the estimated size of the lesion, the uncorrected quantitation, the size of the reconstructed lesion, the local perturbation response, the normalized smoothing parameter and the estimated background activity concentration; and calculating, by the processor, a corrected quantitation as a function of:

((the uncorrected quantitation−the estimated background activity concentration)/the pre-calculated contrast recovery coefficient value)+the estimated background activity concentration.

11. The system of claim 10, wherein selecting, by the processor, the pre-calculated contrast recovery coefficient comprises accessing the pre-calculated contrast recovery coefficient from a lookup table (LUT) residing in a memory operatively coupled to the processor, and wherein the LUT includes a plurality of contrast recovery coefficient values each indexed according to at least one of the size of the lesion, the size of the reconstructed lesion, the uncorrected contrast quantitation, the local perturbation response and the smoothing parameter; and wherein the memory further includes computer-executable instructions that when executed by the processor cause the processor to calculate the local perturbation response by subtracting the estimated background activity concentration from the reconstructed image in the region of interest.

12. The system of claim 10:

wherein the memory further includes computer-executable instructions that when executed by the processor cause the processor to store, in a database, an aggregate certainty map comprising aggregate certainty values for a voxel set, and the reconstructed PET image, and wherein the aggregate certainty map is associated with the reconstructed PET image stored in the database.

13. The system of claim 10, wherein the memory further includes computer-executable instructions that when executed by the processor cause the processor to:

calculate the pre-calculated contrast recovery coefficient value by:

simulating a lesion of a particular size and activity concentration in an object background with a unit background activity concentration to produce a simulated object;

generating simulated PET emission data based on the simulated object;

reconstructing the simulated object from the simulated PET emission data by maximizing a penalized-likelihood objective function with a variable smoothing parameter to produce a reconstructed PET image;

quantifying a simulated activity concentration in a region of interest of the reconstructed PET image to produce a simulated uncorrected quantitation of the reconstructed PET image;

calculating the simulated uncorrected contrast quantitation by subtracting the background activity concentration from the simulated uncorrected quantitation;

calculating the pre-calculated contrast recovery coefficient value as a ratio of the simulated uncorrected contrast quantitation to the difference of an actual quantitation of the simulated object and the background activity concentration;

calculating one of a simulated local perturbation response in the region of interest of the reconstructed PET images and a size of the reconstructed lesion in the reconstructed PET image;

calculating an aggregate certainty value associated with the region of interest based on the simulated PET emission data; and calculating the variable smoothing parameter normalized by the aggregate certainty value; and store the pre-calculated contrast recovery coefficient value in the LUT indexed according to at least one of the particular size of the lesion, the size of the reconstructed lesion in the reconstructed PET image, the uncorrected contrast quantitation, the local perturbation response of the reconstructed PET image and the variable smoothing parameter.

14. The system of claim 13, wherein the memory further includes computer-executable instructions that when executed by the processor cause the processor to repeat the step of calculating the pre-calculated contrast recovery coefficient value for a plurality of simulated lesions having different sizes and/or activity concentrations.

15. The system of claim 10, wherein the uncorrected quantitation includes a standardized uptake value.

16. The computer-implemented method of claim 1, further comprising:

transmitting the reconstructed PET image and at least one of an aggregate certainty map, a smoothing parameter map, and a normalized smoothing parameter map, to a workstation, wherein the aggregate certainty map is associated with the reconstructed PET image and comprising aggregate certainty values for a voxel set, wherein the smoothing parameter map is associated with the reconstructed PET image and comprising spatially modulated smoothing parameters for a voxel set, and wherein the normalized smoothing parameter map is associated with the reconstructed PET image and comprising the smoothing parameters normalized by the aggregate certainty values for a voxel set; and performing correcting the uncorrected quantitation at the workstation.

17. A computer-implemented method for partial volume correction in Positron Emission Tomography (PET) image reconstruction, the computer including a processor, the method comprising:

receiving emission data related to an activity distribution;

reconstructing the activity distribution from the emission data by maximizing a penalized-likelihood objective function based on a smoothing parameter to produce a reconstructed PET image;

quantifying an activity concentration in a region of interest of the reconstructed PET image to produce an uncorrected quantitation;

calculating an aggregate certainty value associated with the region of interest based on the emission data;

calculating an estimated background activity concentration in the region of interest;

calculating a normalized smoothing parameter by dividing the smoothing parameter associated with the region of interest by the calculated aggregate certainty value or dividing the smoothing parameter associated with the region of interest by the calculated aggregate certainty value and the estimated background activity concentration;

calculating a size of a reconstructed lesion associated with the region of interest based on the reconstructed PET image;

receiving or calculating at least one of an estimated size of a lesion associated with the region of interest and a local perturbation response in the region of interest of the reconstructed PET image;

transmitting the reconstructed PET image and the normalized smoothing parameter map associated with the reconstructed PET image to a workstation; and correcting, at the workstation, the uncorrected quantitation based on a pre-calculated contrast recovery coefficient value to account for a partial volume error in the uncorrected quantitation, wherein correcting the uncorrected quantitation comprises:

receiving or calculating one of an estimated size of a lesion in the region of interest, a size of the reconstructed lesion or a local perturbation response in the region of interest of the reconstructed image;

receiving an estimated background activity concentration in the region of interest;

selecting the pre-calculated contrast recovery coefficient value from a lookup table (LUT) based on at least one of the estimated size of the lesion, the uncorrected quantitation, the size of the reconstructed lesion, the local perturbation response, the normalized smoothing parameter and the estimated background activity concentration; and calculating a corrected quantitation as a function of:

((the uncorrected quantitation−the estimated background activity concentration)/the pre-calculated contrast recovery coefficient value)+the estimated background activity concentration.

\* \* \* \* \*